June 12, 1951  R. M. PAGE  2,556,212
PRECISION RANGE INDICATING SYSTEM
Filed March 11, 1943
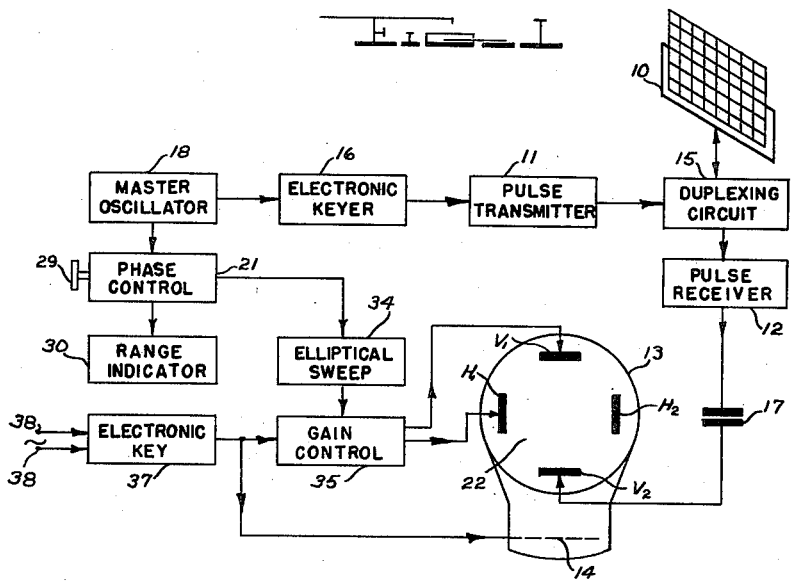
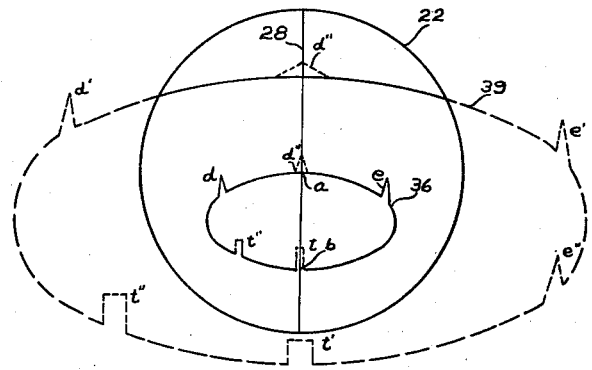
ROBERT M. PAGE  *Inventor*
By *[signature]*
*Attorney*

Patented June 12, 1951

2,556,212

UNITED STATES PATENT OFFICE 2,556,212

PRECISION RANGE INDICATING SYSTEM

Robert M. Page, Washington, D. C.

Application March 11, 1943, Serial No. 478,831

9 Claims. (Cl. 343—13)

(Granted under the act of March 3, 1883, as amended April 30, 1928; 370 O. G. 757)

This invention relates to an indicating apparatus and more particularly to methods of and means for indicating range of remote objects detected by radio echo apparatus or similar devices with a high degree of accuracy.

Systems provided by the prior art for indicating range of remote objects detected by radio echo apparatus or similar ranging equipment are only capable of producing approximate range indications and are therefore inadequate for utilization in instances wherein extremely high degrees of accuracy are required, for example, in connection with gun fire control apparatus.

More particularly, such prior indicating systems include a cathode ray oscillograph, or similar indicating devices, in connection with a sweep circuit for producing a linear time sweep line of the electron beam of the oscillograph. Such time sweeps are generally operated in synchronism with the energy pulses emitted by the ranging apparatus and have a time length substantially equal to the time interval between the equally spaced energy pulses transmitted by the ranging apparatus. Thus, whenever the transmitted energy pulses impinge upon a remote object, energy pulses are reflected from such object and received at the apparatus where they are instantaneously applied to the oscillograph to deflect or modulate the intensity of the electron beam and thereby provide a visual indication of the time required for an energy wave to travel from the apparatus to the object and back again. The time sweep axis of the electron beam is generally graduated in range units and thereby provides a means for obtaining a direct indication of the object range. As mentioned above, however, range indications obtained in the foregoing manner are not of a high degree of accuracy, since the ratio of actual object range to a corresponding length in time sweep is extremely high and therefore inherently results in a low degree of reading accuracy. Consequently, these range indications are inadequate for fire control purposes, or other such similar purposes demanding precision range indications.

It is therefore an object of the present invention to provide a novel method of indicating range of remote objects detected by range apparatus or similar systems.

Another object is to provide a novel means for indicating range of remote objects with a high degree of accuracy and reliability.

Another object is to provide a novel system for indicating range of remote objects detected by radio echo apparatus which includes novel vernier means for obtaining extremely accurate range indications.

Another object is to provide a system for indicating range of remote objects detected by radio echo apparatus which includes novel electronic vernier means for providing range indications of absolute accuracy.

Another object is to provide a novel indicating system for ranging apparatus, which includes a cathode ray oscillograph, a means for producing a closed time sweep such as an elliptical or circular trace thereon, with means for expanding said sweep and showing a portion of said expanded sweep on said oscillograph and a means for moving all time indications on said expanded sweep into the visible portion thereof.

Other objects and features of the invention will appear more fully hereinafter from the following detailed description when considered in connection with the accompanying drawings. It is to be understood, however, that the drawings are designed for purpose of illustration only and do not define the limits of the invention, reference for the latter purpose being had to the appended claims.

Fig. 1 is a block diagram of a radio echo apparatus embodying the principles of the invention, and Fig. 2 is an illustration of the sweep and time indications on an oscillograph produced by the apparatus disclosed in Fig. 1.

With reference more particularly to Fig. 1 of the drawing, a radio echo apparatus constructed in accordance with the principles of the present invention is disclosed therein, including directional beam antenna 10, pulse transmitter 11, pulse receiver 12 and duplexing circuit 15, which is now well known to the art and permits energy transmission and reception on a single antenna. A master oscillator 18 is coupled to the pulse transmitter 11 through the electronic keyer 16 and thereby maintains the energy pulse repetition rate of the transmitter 11 equal to the frequency of the master oscillator 18. This series of energy pulses generated by pulse transmitter 11 is passed through a channel of the duplexing circuit 15 and emitted from antenna 10 as a highly directive energy beam. The output of the master oscillator 18 is also connected to a suitable elliptical sweep generator 34 by way of the phase control device 21, the function of which will appear more fully hereinafter. The output of the elliptical sweep generator 34 is connected through the gain control device 35 to the vertical deflecting plate $V_1$ and the horizontal deflecting plate H₁ of the oscillograph 13 for producing an elliptical time sweep of the electron beam thereof. The express purpose of the gain control device will appear more fully hereinafter, but for the present it will be sufficient to state that it controls the magnitude of the elliptical sweep. Thus from the apparent connections of the master oscillator 18 to the pulse transmitter 11 and elliptical sweep generator 34 it becomes obvious that at a zero setting of the phase control device 21, viz., when the input potentials to the keyer 16 and the sweep circuit 34 are in phase, the transmitter 11 will emit an energy pulse from antenna 10 simultaneously with the initiation of the elliptical trace 36 on oscillograph 13 as shown in Fig. 2. Consequently the elliptical sweep 36, under the foregoing condition, will contain an indication of the transmitted energy wave $t$ which will, in this case, designate the starting point of the sweep. Hence as the transmitted energy wave proceeds in a directive line from antenna 10, it is further assumed that the electron beam moves in a clockwise direction. Consequently as the antenna 10 receives reflected energy from remote objects being impinged upon by the transmitted energy wave, the received energy is passed through a channel of the duplexing circuit 15 and receiver 12 where it is suitably amplified and applied to the vertical deflecting plate V₂ to produce, for example, range indications $d$ and $e$ time displaced on the sweep with respect to transmitted pulse $t$.

As mentioned heretofore, one embodiment of the present invention is to provide a novel means for expanding the electron beam sweep of an oscillograph. With reference more particularly to Fig. 1, an electronic key 37 is provided for periodically applying energy pulses to the gain control 35 and intensity grid 14 at a rate determined by a signal applied to the input terminals 38, 38 of the electronic key 37. The gain control operates to control the major and minor axes of the elliptical sweep and in response to the output of key 37 to increase proportionally these axes in order to produce the expanded trace 39 concentric with trace 36. Thus there simultaneously exists on screen 22 of oscillograph 13, trace 36 with all range indications of reflecting objects within the range of the apparatus together with a portion of the expanded trace 39. There exists, however, due to the greatly increased magnitude of the expanded sweep, a great danger of circumventing the screen 22 with the electron beam, during the production of this expanded sweep. For this reason the sweeps 36 and 39 are biased off center of the oscillograph 13 to render visible a portion of the expanded trace 39 as shown in Fig. 2. Since both sweep 36 and 39 contain the same angular velocity and therefore the same range limits but different tangential velocities and therefore different ratios of unit length of time sweep to object range, a greatly increasing reading accuracy exists by utilizing the expanded sweep. It must be understood, however, that a manual means could be used for increasing the gain and thereby eliminate the visibility of the original trace 36 and leave only the expanded sweep 39 without departing from the spirit of the invention. The operation of the phase control device 21 will be discussed in greater detail hereinafter, but for the present it will be sufficient to state by varying the phase of the input potential of the elliptical sweep generator 34 with respect to input potential to the electronic keyer 16 the initiation of the sweep 36 and consequently 39 can be made prior or subsequent to energy transmission and thereby cause all time indications to move ahead or back on the time sweeps until they finally appear on the screen 22 of the oscilligraph 13.

Now to consider another embodiment of the present invention which permits the measurement of range of remote objects with an extremely high degree of accuracy. Let it be assumed, for example, that it is desired to find accurately the range of the remote object producing indication $d$ on sweep 36. From a general understanding of the conventional phase shifting means such as 21, it becomes obvious that the phase difference between the input voltage of transmitter 11 and sweep circuit 34 can be varied 180° continuously without limit. Consequently by manually operating the phase control means 21 with graduated dial 29 the phase of the input voltage to the sweep circuit 34 can be increased so as to initiate the sweep of the electron beam of the oscillograph 13 prior to the transmission of an energy pulse from antenna 10. Consequently, one method of measuring the range of indication $d$ is accomplished by varying the phase of the input voltage to the sweep circuit in the foregoing manner to cause indication $t$ to move ahead on the time sweep and in a clockwise direction from point $t$ as previously assumed, until the indication of the transmitted pulse coincides with reference line 28 at point $a$. This provides a zero range setting for dial 29 and range indicator 30. The reference line 28 as provided on the viewing screen 22 may be engraved on the minor axis of the sweep or produced electrically, by deflection of the electron beam, for example, synchronized with the generation of the sweeps. The range indicator 30 is either an electrical or mechanical means for providing range readings obtained by dial 29, at remote points, such as, for example, adjacent the guns. After obtaining the zero setting of dial 29 and range indicator 30 the phase control means 21 is again varied in the proper direction until indication $d$ of trace 36 coincides with reference line 28 at point $a$ as shown by indication $d''$ in Fig. 2. It therefore becomes obvious that the ranging of any object can be ascertained very accurately by first centering the indication of the transmitted pulse $t$ on either one of the points $a$ or $b$ of reference line 28 and thereafter centering the reflected energy indication of the object on the same point of line 28 and the object range will then be represented as the phase shift necessary to perform this operation since there exists a definite range relation between the initiation of the time sweep and energy transmission.

Due to the greatly increased velocity of the sweep 39 over that of 36, the indications thereon will be expanded proportional to the degree of sweep expansion itself and thereby provide a more accurate means of centering the indication on the reference line 28. Thus it is advisable to use the expanded sweep 39 for centering all indications and consequently result in a higher degree of reading accuracy.

It should be understood that the practice of the invention is not limited to the embodiments illustrated and described but is circumscribed only by the scope and limitations of the appended claims.

The invention described herein may be manufactured and used by or for the Government of the United States of America for governmental purposes without the payment of any royalties thereon or therefor.

I claim:

1. An apparatus for indicating range of remote objects comprising means producing and transmitting an intermittent energy wave, means receiving reflected energy from remote objects impinged by said energy wave, means producing a timing wave having a frequency in accordance with the repetition rate of said intermittent energy wave, a cathode ray oscillograph, means producing a closed curved time sweep of the electron beam of said oscillograph in accordance with said timing wave, means applying said received energy to said oscillograph to produce range indications of the remote object from which the energy is reflected, a means for intermittently increasing the amplitude of said closed curved sweep in a manner to permit the original and a portion of said expanded sweep to show on said oscillograph, and means varying the time phase of said timing wave with respect to said intermittent energy wave to thereby shift a selectable one of said indications to a reference position on said time sweep whereby the object range of said selectable indication is represented as a function of said time phase variation.

2. An apparatus for indicating range of remote objects comprising, a master oscillator, a pulse transmitter, a means for keying said pulse transmitter in synchronism with said master oscillator frequency, an oscillograph, a means for producing an elliptical sweep of the electron beam thereof, a means responsive to reception of reflected energy pulses from remote objects impinged by said transmitter pulse to produce a time indication on said oscillograph, a means for varying the time phase between the transmission of an energy pulse and the initiation of the electron beam sweep to thereby shift a selectable one of said indications to a reference position on said time sweep whereby the range of said selectable indication is represented as a function of said time phase.

3. An apparatus for indicating range of remote objects comprising, a master oscillator, a pulse transmitter, a means for keying said pulse transmitter in synchronism with said master oscillator frequency, an oscillograph, a means for producing an elliptical sweep of the electron beam thereof, a means responsive to reception of reflected energy pulses from remote objects being impinged upon by said transmitter pulse to produce a time indication on said oscillograph, a means for expanding said electron beam sweep, a means for varying the time phase between the transmission of an energy pulse and the initation of the electron beam sweep to center said time indication on a reference line on said oscillograph, and a graduated means for interpreting the time phase in terms of range.

4. An apparatus for indicating range of remote objects comprising, a master oscillator, a pulse transmitter, a means for keying said pulse transmitter in synchronism with said master oscillator frequency, an oscillograph, a means for producing an elliptical sweep of the electron beam thereof, a means responsive to reception of reflected energy pulses from remote objects being impinged upon by said transmitter pulse to produce a time indication on said oscillograph, a means for intermittently expanding said electron beam sweep in a manner to provide the oscillograph with the entire original elliptical sweep and a portion of the expanded sweep, a means for varying the time phase between the transmission of an energy pulse and the initiation of the elliptical sweeps to center said time indication on a reference line on said oscillograph, and a graduated means for interpreting the time phase in terms of range.

5. An indicator system comprising, a cathode ray oscillograph, a sweep generator for producing a single frequency sweep voltage, an amplitude control circuit for coupling said sweep voltage to said cathode ray tube oscillograph, and a second control circuit connected to said amplitude control circuit for changing the amplitude of the output of said amplitude control circuit between two distinct levels in sequenced alternation.

6. An indicator system comprising, a cathode ray oscillograph, means operative to produce a single frequency closed time trace on said oscillograph, said last named means including an amplitude control circuit operative to so alternatively change the amplitude of said time trace as to produce a pair of time traces on said oscillograph, one of said traces being an expanded portion of the other.

7. An indicator system comprising, a cathode ray oscillograph, means operative to produce a closed time trace on said oscillograph, phase shift means for adjusting the time phase of initiation of said trace relative to a regularly recurrent time function, said first named means including a velocity control circuit operative to so alternately change the velocity of said time trace as to produce a pair of time traces on said oscillograph, one of said traces being an expanded portion of the other.

8. Apparatus for indicating range of remote objects comprising, means periodically transmitting energy pulses, means receiving said energy pulses after reflection from remote objects, a cathode ray tube indicator, means operative to produce a time trace of the electron beam of said indicator equal in duration to the period between successive transmitted pulses, means applying said received energy to said indicator to produce indications of the time sequence of reception of the energy reflected from each transmitted pulse, and means for varying the time phase of initiation of said time trace with respect to the transmitted pulses thereby to shift a selectable one of said indications to a reference position on said time trace whereby the range of the object producing said selectable indication is represented as a function of said phase variation.

9. Apparatus for indicating range of remote objects comprising, means periodically transmitting energy pulses, means receiving said energy pulses after reflection from remote objects, a cathode ray tube indicator, means operative to produce a time trace of the electron beam of said indicator equal in duration to the period between successive transmitted pulses, means applying said received energy to said indicator to produce indications of the time sequence of reception of the energy reflected from each transmitted pulse, means periodically increasing the velocity of said time trace, and means varying the time phase of initiation of said time trace relative to the transmitted pulses whereby a selectable one of the indications may be shifted into a reference position on the expanded sweep, whereby the range of the object producing said selectable indication is represented as a function of the phase shift necessary to so position the indication.

ROBERT M. PAGE.

(References on following page)

REFERENCES CITED

The following references are of record in the file of this patent:

UNITED STATES PATENTS

| Number | Name | Date |
|---|---|---|
| 2,227,598 | Lyman et al. | Jan. 7, 1941 |
| 2,300,189 | Wolff | Oct. 27, 1942 |
| 2,312,761 | Hershberger | Mar. 2, 1943 |
| 2,405,239 | Seeley | Aug. 6, 1946 |
| 2,409,462 | Zworykin | Oct. 15, 1946 |
| 2,426,216 | Hight | Aug. 26, 1947 |
| 2,426,989 | De Rosa | Sept. 9, 1947 |
| 2,433,385 | Miller | Dec. 30, 1947 |
| 2,450,341 | Hershberger | Sept. 28, 1948 |
| 2,454,782 | De Rosa | Nov. 30, 1948 |
| 2,471,408 | Busignies | May 31, 1949 |

OTHER REFERENCES

Pro. of the I. R. E., vol. 25, No. 12, Dec. 1937, pp. 1531–1541.

The Cathode Ray Oscillograph in Radio Research, by R. A. Watson-Watt et al., HMS Office, London, Eng., reprinted No. 1935, pp. 81 and 82.